April 29, 1952   G. L. RITCH   2,594,682
AIR SCOOP FOR AUTOMOBILES
Filed Aug. 1, 1949
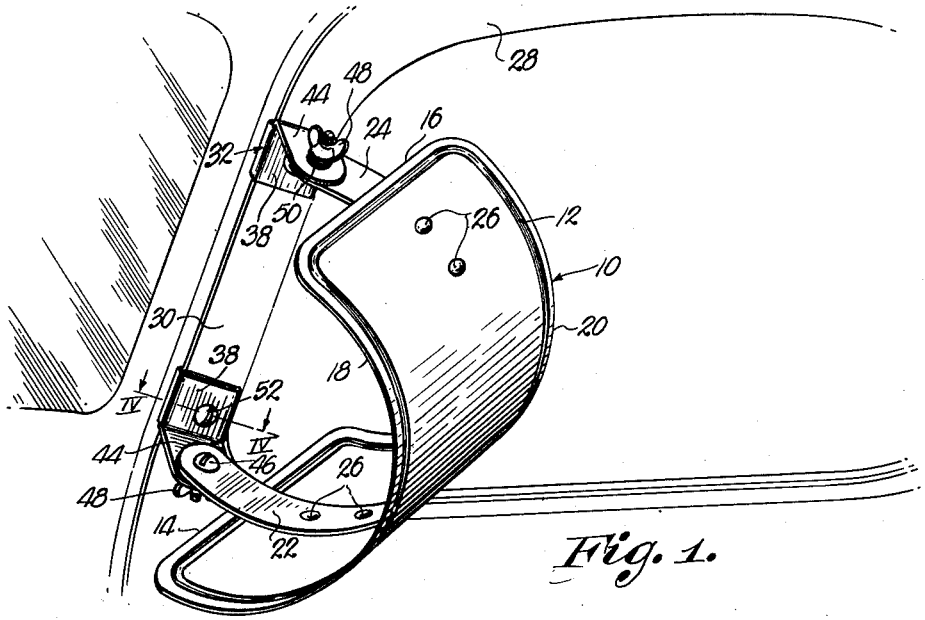
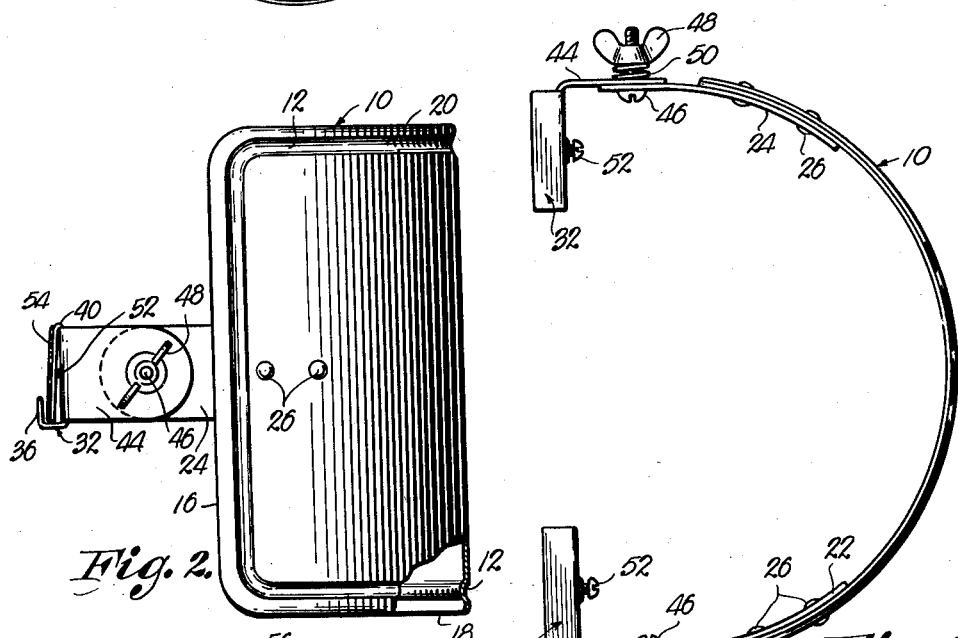
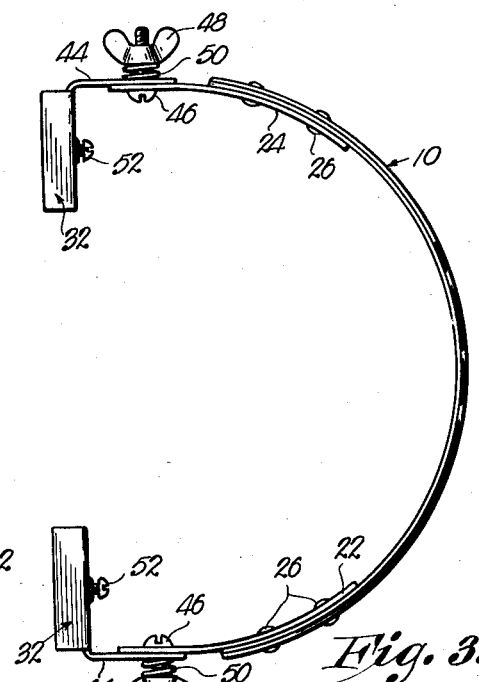
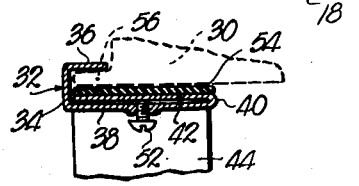
INVENTOR.
George L. Ritch
BY
ATTORNEY.

Patented Apr. 29, 1952

2,594,682

UNITED STATES PATENT OFFICE 2,594,682

AIR SCOOP FOR AUTOMOBILES

George L. Ritch, Harrisonville, Mo.

Application August 1, 1949, Serial No. 107,865

3 Claims. (Cl. 98—2)

1

This invention relates to automotive accessories and more particularly to an inexpensive, durable and attractive air scoop adapted for releasable mounting upon the frame of a window of the automobile and movable with respect thereto to various selected positions within the air stream of the moving automobile whereby to effectively deflect or carry a desired amount of air into the body interior of the automobile in accordance with the wishes of the operator.

It is the primary object of the present invention to provide an air scoop of the above mentioned character that is so formed, positioned and contoured as to receive an abundance of air as desired by the user and to direct the same into the interior of the automobile where the cooling effect of the air is most effective and yet not irritating or distracting to the automobile occupants.

Another important object of the present invention is to provide an air scoop that includes an arcuate, substantially semi-circular panel having means at the ends thereof for pivotally securing the same to the framework of an automobile window.

Another object of the present invention relates to the way in which the arcuate panel is releasably secured to the aforesaid frame by means of a specially formed bracket that eliminates the necessity of mutilating said frame in any manner whatsoever.

Other more minor objects will be made clear or become apparent as the following specification progresses, reference being had to the accompanying drawing, wherein:

Fig. 1 is a perspective view of an air scoop for automobiles made in accordance with my present invention.

Fig. 2 is a top plan view thereof, parts being broken away for clearness.

Fig. 3 is a side elevational view thereof; and

Fig. 4 is a fragmentary, detailed, cross-sectional view taken on line IV—IV of Fig. 1 looking in the direction of the arrows.

Present day automobiles are quite universally provided with swingable deflectors that move on a substantially vertical axis adjacent the forwardmost end of the front door window. These deflectors are occasionally also provided for the back seat but the same are incapable of moving a large amount of air into the automobile body at a desired point and further, such deflectors are not usually provided for in trucks.

Accordingly, it is contemplated that the air scope forming the subject matter hereof be employed primarily as an accessory for truck bodies,

2 for busses and for other vehicles wherein the common deflector is not provided. It is to be understood however, that because of the advantages hereof, the same may also be used in lieu of the deflector that is now used on passenger cars and also that the same may be had for instance in such vehicles on the back doors or windows if desired.

The air scoop per se comprises an arcuate panel broadly designated by the numeral 10. As is clear in Figs. 1 to 3 inclusive, panel 10 is elongated and has its longitudinal axis bent into an arc that is substantially a semi-cylindrical segment. Longitudinally therefore, the panel 10 is substantially a semi-circle.

Any suitable material may be utilized for forming the panel 10 and in the interest of strength and rigidity, a marginal rib 12 is formed therein. Panel 10 is transversely straight and flat and accordingly the opposed ends 14 and 16 respectively thereof, are straight, whereas the longitudinal edges 18 and 20 are arcuate throughout their lengths.

A pair of elongated arms or straps 22 and 24 are secured directly to the innermost face of the panel 10 through the medium of rivets 26 or like fastening elements. Arms 22 and 24 are disposed adjacent to the corresponding ends 14 and 16 of the panel 10 and, as indicated in Figs. 1 to 3 inclusive, extend outwardly beyond such proximal ends.

It is of course understood that arms 22 and 24 may well be joined into a continuous, arcuate band which would decrease cost of manufacture and also further strengthen panel 10. Also such band or the straps 22 and 24 may be disposed on the outer face of panel 10 if desired. Further it is obvious that straps 22 and 24 could be entirely eliminated and each end of perforated ear 44 could be pivoted to an outwardly extending ear on panel 10 and integral therewith.

An automobile window frame, designated by the numeral 28, is shown in Fig. 1 of the drawing and in the instance illustrated, also forms a part of one of the doors of the automobile. The air scoop is designed to be mounted upon such frame 28 along the forwardmost, substantially vertical portion 30 thereof, as shown in Fig. 1.

Each of the arms 22 and 24 is provided with a bracket broadly designated by the numeral 32 to releasably secure the entire air scoop to portion 30 of frame 28. Bracket 32 is formed from an initially flat strip of material into the shape of an U, as shown in Fig. 4, presenting a bight portion 34 and a pair of legs 36 and 38.

Leg 38 is appreciably longer than leg 36 and is rebent upon itself as at 40 to present a flap 42 that extends entirely along the innermost face of the leg 38. One longitudinal edge of the leg 38 is also provided with an ear 44 that extends laterally and outwardly from the outermost face thereof in substantial perpendicular relationship thereto.

The ears 44 are provided with openings that align with corresponding openings in the arms 22 and 24 as the case may be for receiving a pivot bolt 46 having a wing-nut 48 threaded thereon and a spring 50 coiled thereabout between wing-nut 48 and ear 44.

The legs 38 are also each provided with a relatively small set screw 52 that is threaded therein and extends into engaging relationship with the proximal face of flap 42. The opposite face of the flap 42 has a lining 54 of rubber-like material or other substance that is soft and resilient. Lining 54 may, if desired, be secured directly to the flap 42 by means of adhesive or other fastening means.

As shown in Fig. 4 of the drawing, the frame piece 30 is usually formed with a laterally extending flange 56. The brackets 32 embrace the flange 56 with the legs 36 thereof disposed on the outermost face of flange 56 and with the legs 38 thereof extending along the innermost face of the frame piece 30. Consequently, when the set screws 52 are moved to force the flap 42 away from the leg 38, the brackets 32 will be clamped in place upon the frame 30 with legs 36 bearing tightly against one face of the flange 56 and the pad of resilient material 54, bearing tightly against the innermost face of frame 30. After the bracket 32 has been mounted in this fashion, the operator may adjust the scoop as desired by swinging the entire panel 10 on the pivots 46 and thereupon manipulating the wing-nuts 48 to clamp the arms 22 and 24 to their respective ears 44.

It is seen that panel 10 may be moved into the air stream as far as desired and that the amount of air that is directed into the interior of the truck cab or automobile body will depend entirely upon the position of the panel 10. Furthermore, air that is directed into the automobile interior will strike the occupants at their waist and be also directed toward the floor and around the occupants' feet. The air coming into the body with force will not strike the faces of the occupants because of the particular angularity of the panel 10 and the position thereof with respect to such occupants.

It is appreciated that the entire scoop may be quickly and inexpensively manufactured and that the same may be sold for mounting by the purchaser without the need of using tools, nor of mutilating or marring any portion of the automobile body. When the air scoop is removed for any purpose, the frame 28 will not show the effects of supporting the scoop because of the particular formation of bracket 32 and the utilization of the resilient materials 54.

Minor details of construction and other changes and modifications may manifestly be made within the spirit of this invention and it is, therefore, desired to be limited only by the scope of the appended claims.

Having thus described the invention, what is claimed as new and desired to be secured by Letters Patent is:

1. An air scoop comprising an elongated, longitudinally arched, transversely straight panel having a pair of spaced ends; mounting means extending outwardly beyond each end respectively of the panel; an L-shaped bracket for each mounting means respectively, each bracket having a leg pivotally secured to a corresponding mounting means; and means on the other leg of each bracket respectively for attaching the same to an upright portion of an automobile window frame, the pivotal axis between the brackets and the mounting means being substantially parallel with said upright portion whereby to render the panel swingable into and out of the automobile through the window frame.

2. An air scoop comprising a semi-cylindrical panel having a pair of spaced, elongated ends; and means at each of said ends respectively for fastening the panel to an upright window frame of an automobile for swinging movement of the panel into and out of the automobile on an axis substantially parallel with a plane through said ends and parallel with the longitudinal axes of said elongated ends, said means each including pivotally interconnected parts on said panel and on said frame respectively, said parts on the panel each including an elongated arm secured to one face of the panel and extending outwardly beyond the proximal end thereof.

3. An air scoop comprising an arcuate panel having a pair of opposed ends; and means at each of said ends respectively for fastening the panel to a window frame of an automobile, said means each including a bracket having elements on opposite sides of a portion of said frame, one of the elements having a pair of integrally interconnected, relatively overlapping, resilient plates and means for separating the plates whereby to force the other element tightly against the frame as the plates are separated.

GEORGE L. RITCH.

REFERENCES CITED

The following references are of record in the file of this patent:

UNITED STATES PATENTS

| Number | Name | Date |
| --- | --- | --- |
| 1,978,399 | Blakeslee | Oct. 30, 1934 |
| 1,992,413 | Callahan | Feb. 26, 1935 |
| 2,350,297 | Vesta | May 30, 1944 |

FOREIGN PATENTS

| Number | Country | Date |
| --- | --- | --- |
| 297,617 | Great Britain | Sept. 27, 1928 |
| 463,650 | Great Britain | Apr. 5, 1937 |